United States Patent

[11] 3,591,050

| [72] | Inventors | Vincent J. Kupersmith<br>Shawnee Mission, Kans.;<br>Homer C. Hartung, Kansas City, Mo. |
|---|---|---|
| [21] | Appl. No. | 780,444 |
| [22] | Filed | Dec. 2, 1968 |
| [45] | Patented | July 6, 1971 |
| [73] | Assignee | Autotank Company<br>Kansas City, Mo. |

[54] TURBOJET AIRCRAFT FUELING AND DEFUELING DEVICE
6 Claims, 15 Drawing Figs.

[52] U.S. Cl. .................................................. 222/23, 222/189
[51] Int. Cl. ...................................................... B67d 5/08, B67d 5/58

[50] Field of Search............................................. 222/52, 23, 318, 178, 71, 176, 30, 189; 141/346, 348

[56] References Cited
UNITED STATES PATENTS

| 2,544,917 | 3/1951 | Dahlem | 222/23 |
| 2,837,241 | 5/1958 | Griswold | 222/52 |
| 2,864,410 | 12/1958 | Saver | 222/318 X |

Primary Examiner—Evon C. Blunk
Assistant Examiner—H. S. Lane
Attorney—Scofield, Kokjer, Scofield & Lowe ABSTRACT: A fueling and defueling system and device for turbojet aircraft having; (1) fuel filtering functions on bypass operation, (2) combined fuel flow circuits on recycle fuel flow retest and defueling, and (3) a vacuum defueling system created by recycle flow from the fuel source.

INVENTORS
Vincent J. Kupersmith
Homer C. Hartung

INVENTORS
Vincent J. Kupersmith
Homer C. Hartung

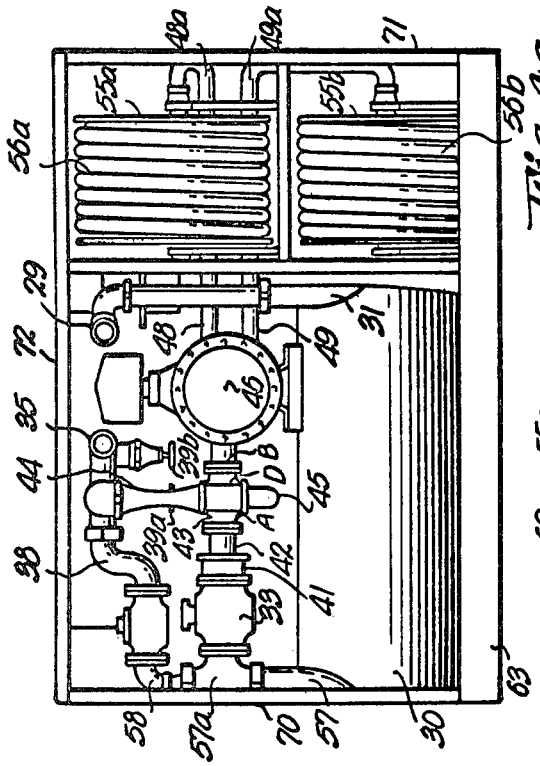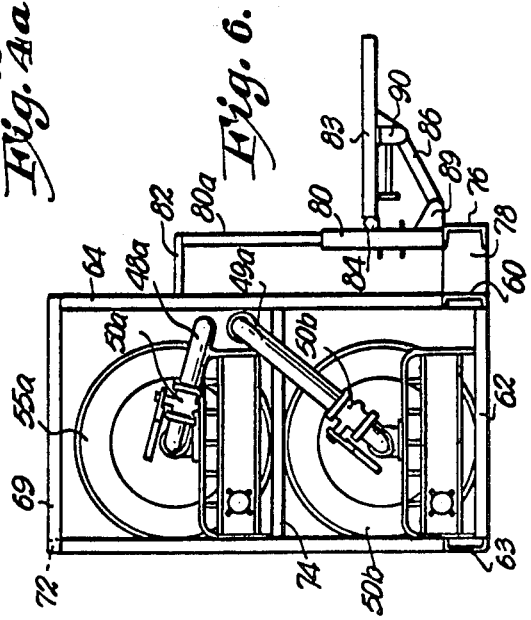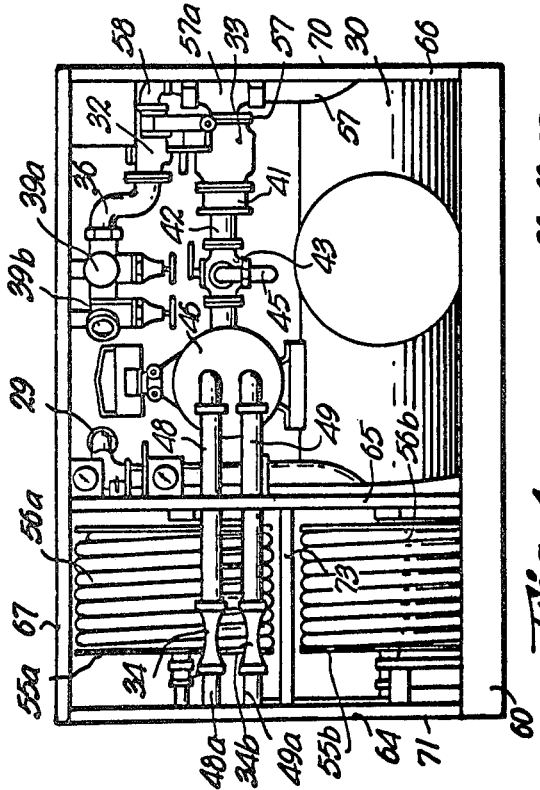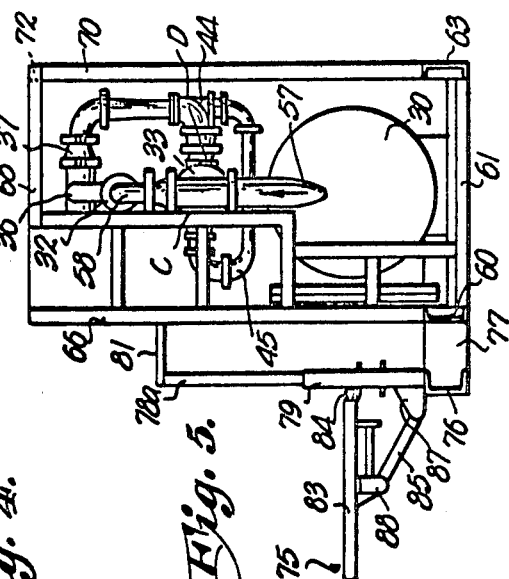
Fig. 4a.
Fig. 6.
Fig. 4.
Fig. 5.
INVENTORS
Vincent J. Kupersmith
Homer C. Hartung
ATTORNEYS

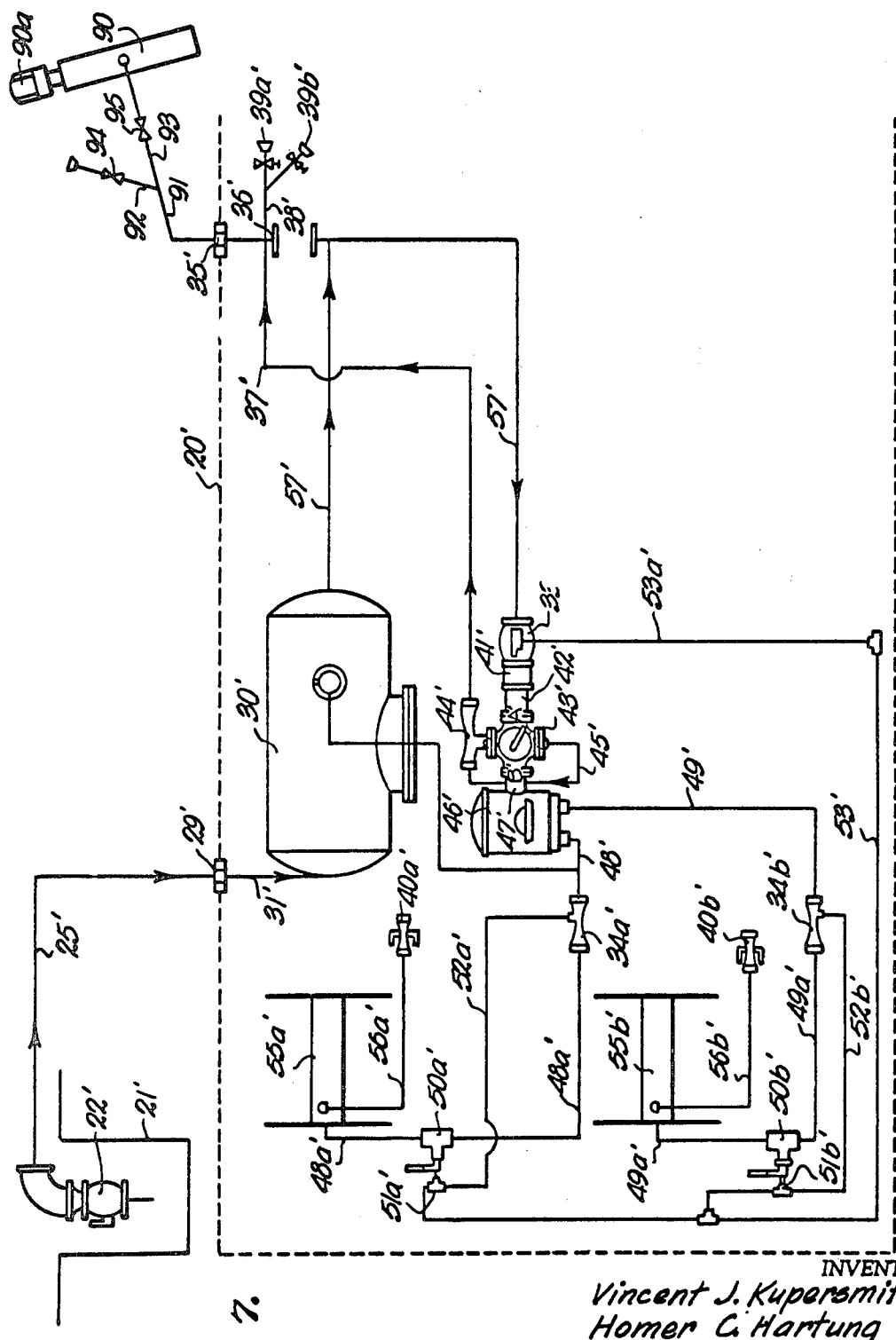

INVENTORS
Vincent J. Kupersmith
Homer C. Hartung

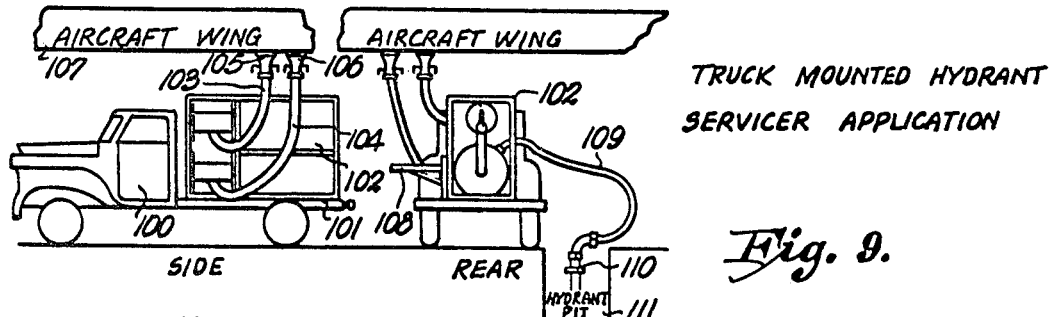
Fig. 9. TRUCK MOUNTED HYDRANT SERVICER APPLICATION
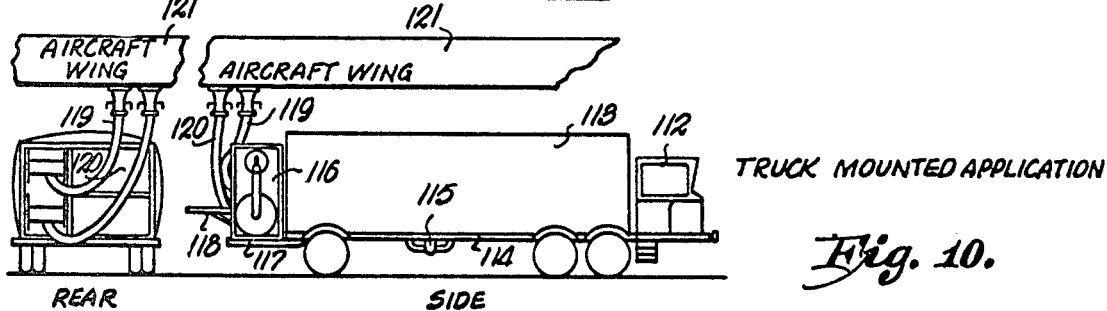
Fig. 10. TRUCK MOUNTED APPLICATION
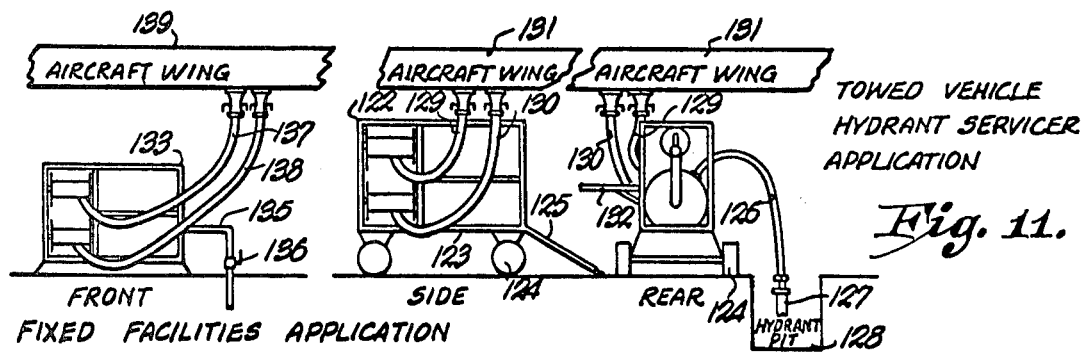
Fig. 11. TOWED VEHICLE HYDRANT SERVICER APPLICATION
Fig. 12. FIXED FACILITIES APPLICATION
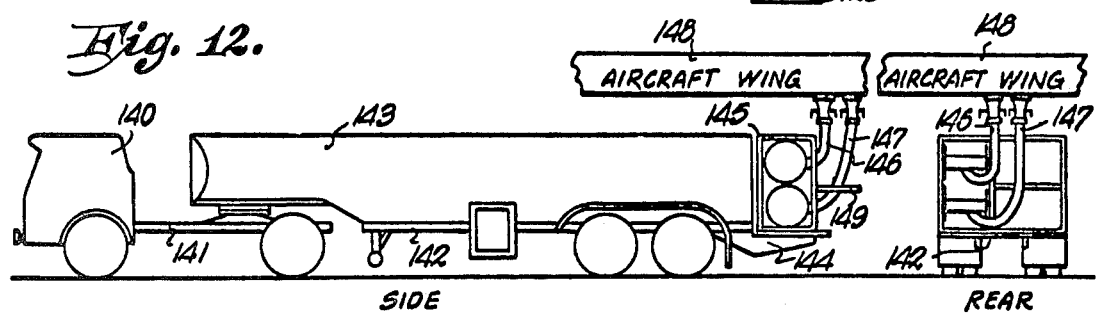
Fig. 13. TRAILER MOUNTING APPLICATION
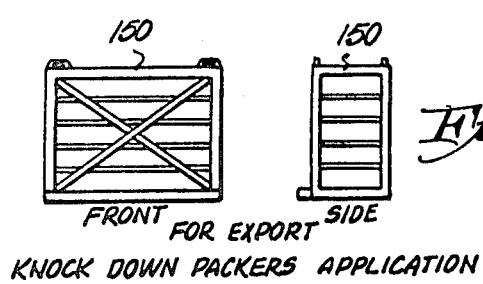
Fig. 14. KNOCK DOWN PACKERS APPLICATION FOR EXPORT
INVENTORS
Vincent J. Kupersmith
Homer C. Hartung
BY
Leofield, Kohjer, Saofield & Lowe
ATTORNEYS

TURBOJET AIRCRAFT FUELING AND DEFUELING DEVICE

THE INVENTION

A fueling and defueling system and device for turbojet aircraft employing; (1) a fuel source, (2) a filter separator, (3) main pressure control valve, (4) fuel-defuel valve, (5) meter, (6) venturis, (7) optional bypass pressure control valve, (8) retest connections connecting flowlines, receptacles and power sources to provide; (a) fueling with filtered bypass flow, (b) vacuum defueling with recycle fuel from the source, and (c) an integrated structural and functional system with combined fuel flow circuits on recycle fuel flow retest and defueling.

An object of the invention is to provide an aircraft fueling and defueling device which is readily adaptable to as many as six applications in the business of high speed fueling and defueling of turbojet aircraft. Equipment has for a long time been available for each of the various types of fueling operations, but never before obtainable for all of the applications as a standard package.

The equipment with which we are dealing in this improvement is restricted to turbojet aircraft. In fueling and defueling jet aircraft, more equipment is required than for gasoline fueled aircraft. This is because kerosene tends to absorb more water than gasoline. Water also may be entrained. The filter is different. A coalescing filter is required in addition to the standard filtering elements used for avgas. One improvement in this system is the method of handling pressure in bypass operations. A first way of handling such pressure is to put the pressure control valve at the truck pump (a centrifugal pump). In the instant system, instead of circulating around the pump, the fuel is recycled through the filter separator. Thus, the instant system utilizes the truck pump, the filter separator and then the bypass pressure control valve in a recycle operation. Any fuel recycled in my apparatus is both cleaned and cooled. (The bypass around the pump provides an ultrashort recycle path with a concomitant heating effect on the fuel. My longer circuit, in contrast, both cleans and cools the fuel).

A further object of the instant invention is to provide bypass pressure control valve means which are not stationed at the truck pump, thereby handling bypass pressure by bypassing the pump, but rather to provide a bypass pressure control valve following the filter separator whereby recycled fuel is cleaned as well as cooled.

Another object of the invention is to provide a fueling and defueling package unit for fueling and defueling jet aircraft wherein the arrangement of the reels and hoses is such that the operator of the vehicle can either stand in front of the aircraft and draw off hoses to fuel each side of the aircraft, with sufficient length to reach the fueling and defueling connections or, alternatively, the vehicle operator may run his truck under the aircraft and stand up on a deck provided for him on the fueling and defueling device. Previously, side reels were provided for stand off fueling and defueling and a complete set of secondary short hoses and nozzles for the rununder fueling and defueling. The combination of these functions without the two extra hoses and reels is a considerable saving in hardware.

Another object of the invention is to provide a turbojet aircraft fueling and defueling device in a single package which may be used, in a first variation, as a truck mounted hydrant servicer. In such use, an inlet hose and coupler are added to the fueling and defueling device for connection to the hydrant valve and adapter which are provided at the airport, recessed in the airport ramp, at strategic locations under each side of the aircraft wings.

Another object of the invention is to provide a turbojet aircraft fueling and defueling device which may, in a second application, be employed as a truck mounted fueler with fuel cargo tank mounted on a specially built truck chassis, the latter fitted with a high performance centrifugal pump.

Another object of the invention is to provide a turbojet aircraft fueling and defueling device which may be employed, per se, in a third application, as a fixed hydrant-type fueling station at an airport location, with the fueling inlet connected into the fixed airport facilities pump and tank storage installations, whereby, in this modification, it is required that the aircraft be brought to the subject fueling and defueling device for refueling.

Another object of the invention is to provide a turbojet aircraft fueling and defueling device and unit which may be employed, in a fourth application, mounted on a wheeled vehicle, per se, capable of being towed by tractor equipment to an aircraft with, in this application, an inlet hose and coupler added to the device for connection to the fuel hydrant valve and adapter which is provided recessed in the airport ramp under each side of the aircraft wings.

Another object of the invention is to provide a turbojet aircraft fueling and defueling device which is employable in a fifth application as a semitrailer type fueler with an hydraulic drive system added whereby truck engine power may be employed to operate a fuel pump mounted on the trailer itself.

Still further, it is an object of the invention to provide a turbojet aircraft fueling and defueling device which is able, in a sixth application, to be supplied as a separate package, knocked down, to either domestic or foreign users for their own adaptation to the above described uses.

A further object of the invention is to provide an aircraft fueling and defueling device for turbojet aircraft wherein all of the components required for fueling and defueling such type aircraft are provided contained within one (1) structural unit, this unit particularly including a primary or main pressure control valve, an eductor and a meter in an extraordinarily compact and unique arrangement whereby the six (6) applications listed above become feasible.

Yet another object and advantage of the invention is to provide a fueling device for turbojet aircraft combining three flow circuits (recycle fuel-flow, retest, and defueling) into a common return to tank connection. Thus, bypassed fuel from the pressure control valve, defueled product from the eductor and retesting fuel from the retest valve assemblies, all return to tank through a common connection.

Another object of the invention is to provide a unique and positive method and means of providing sensing pressure. to the pressure control valves and by means and use of sensing valves directly connected to each hose line valve, whereby when the hose line valves are opened for fuel flow, sense valves are opened simultaneously thereby to provide the required sensing pressure back to the two pressure control valves.

Another object of the invention is to provide a fueling and defueling device for turbojet aircraft as described wherein key changes have been made in orienting components of the fueling and defueling systems and connection thereto; thus for example, the meter and filter become an integrated unit and the filter becomes the structural support for many units in the device itself.

FIG. 1 is a schematic flow diagram of the instant fueling and defueling device showing (within the dotted line enclosure) (1) the basic elements required for aircraft fueling flow including a sensing signal monitoring the fueling flow and (2) the further elements for effecting defueling flow utilizing pressure flow to create a vacuum in an eductor tube. Also seen are fuel inputs from a hydrant pit system and a truck pump and tank system, both schematically indicated, with a recycle line from the device to the fuel tank.

FIG. 4 is an end view (say, looking directly at the rear end of the tank truck of FIG. 13) of the subject fueling and defueling device structurally made up into an optimally arranged apparatus array, the view taken from the end of the device from which the operator will work, the hoses and nozzles being withdrawn toward the viewer in the figure.

FIG. 4a is a view similar to FIG. 4, but taken from the opposite side of the tank truck.

FIG. 5 is a side view taken from the right end of FIG. 4 looking to the left in the view and showing thereon, additionally, an operating platform on which the operator may stand for underwing fueling and defueling of the aircraft.

FIG. 6 is a side view of the device of FIG. 4 looking from the left end of FIG. 4 to the right in the view of FIG. 4 and showing the hose reel side of the device. Also seen is the operating platform first seen in FIG. 5.

FIG. 7 is a schematic flow diagram of a modification of the inventive system wherein a truck pump and tank or trailer tank and pump means are not available. This system and apparatus array is useable in the systems of FIGS. 9, (in this instance without a booster pump), 11 and 12 wherein fuel is provided from a hydrant system and defueling is passed to a hydrant return line or any available tank or tank vehicle.

Figure 8:
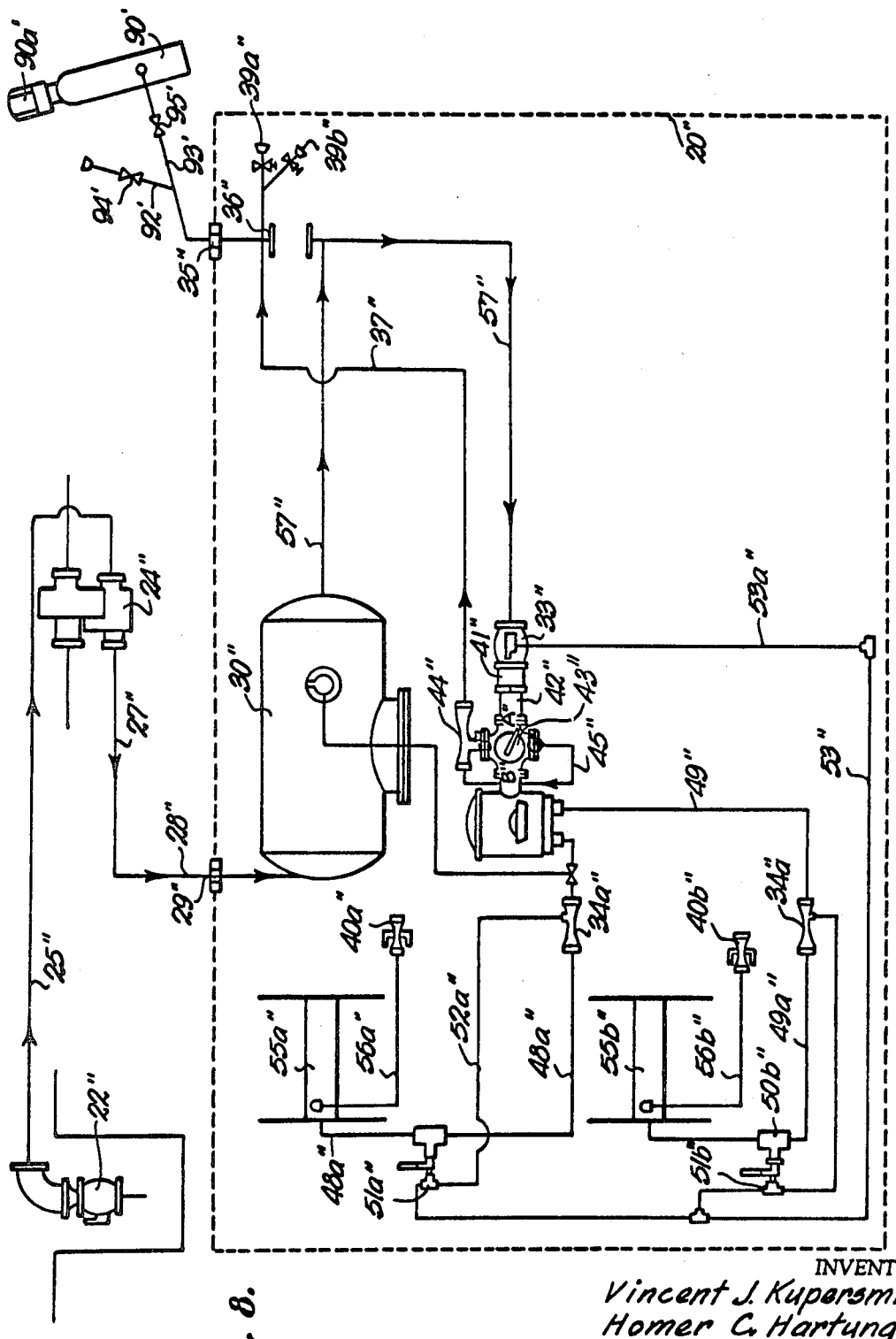

FIG. 8 is a schematic diagram of a fueling and defueling system wherein a vehicle, such as seen in FIG. 9 is available with a booster pump installed on the chassis. Fuel is provided from a hydrant system to the booster pump, but there is not available a tank on the vehicle carrying the subject fueling and defueling device and booster pump. Therefore, fuel return in the defueling operation is to any available separate tank or tank vehicle or via a hydrant return line.

FIG. 9 comprises a side and a rear view of a truck mounted hydrant servicer application of the instant fueling and defueling device which may or may not have a booster pump on the truck. In any case, the fuel is supplied, not from a tank on the vehicle, but from a hydrant source.

FIG. 10 comprises rear and side views of the instant fueling and defueling device mounted at the rear end of a truck which includes a tank. Presumably in such case, there would be provided suitable pumping power on the truck so that a hydrant source would not be required.

FIG. 11 comprises side and rear views of a towed vehicle hydrant servicer application, here a four (4) wheeled cart with a drag bar, no pumping facilities being provided on the cart and the source of fuel being a hydrant pit, as illustrated.

FIG. 12 is a single front view of a fixed facilities application of the instant fueling and defueling device wherein the source of fuel is a hydrant line, schematically indicated.

FIG. 13 comprises side and rear views of a truck trailer mounting application of the instant fueling and defueling device, same shown at the rear end of a trailer tank towed by a truck, pumping facilities being provided on the trailer with power provided from the prime mover.

FIG. 14 shows front and side views of the subject fueling and defueling device crated in a knockdown package application preferably for export.

BASIC DESCRIPTION OF OPERATING COMPONENTS

Figure 1:
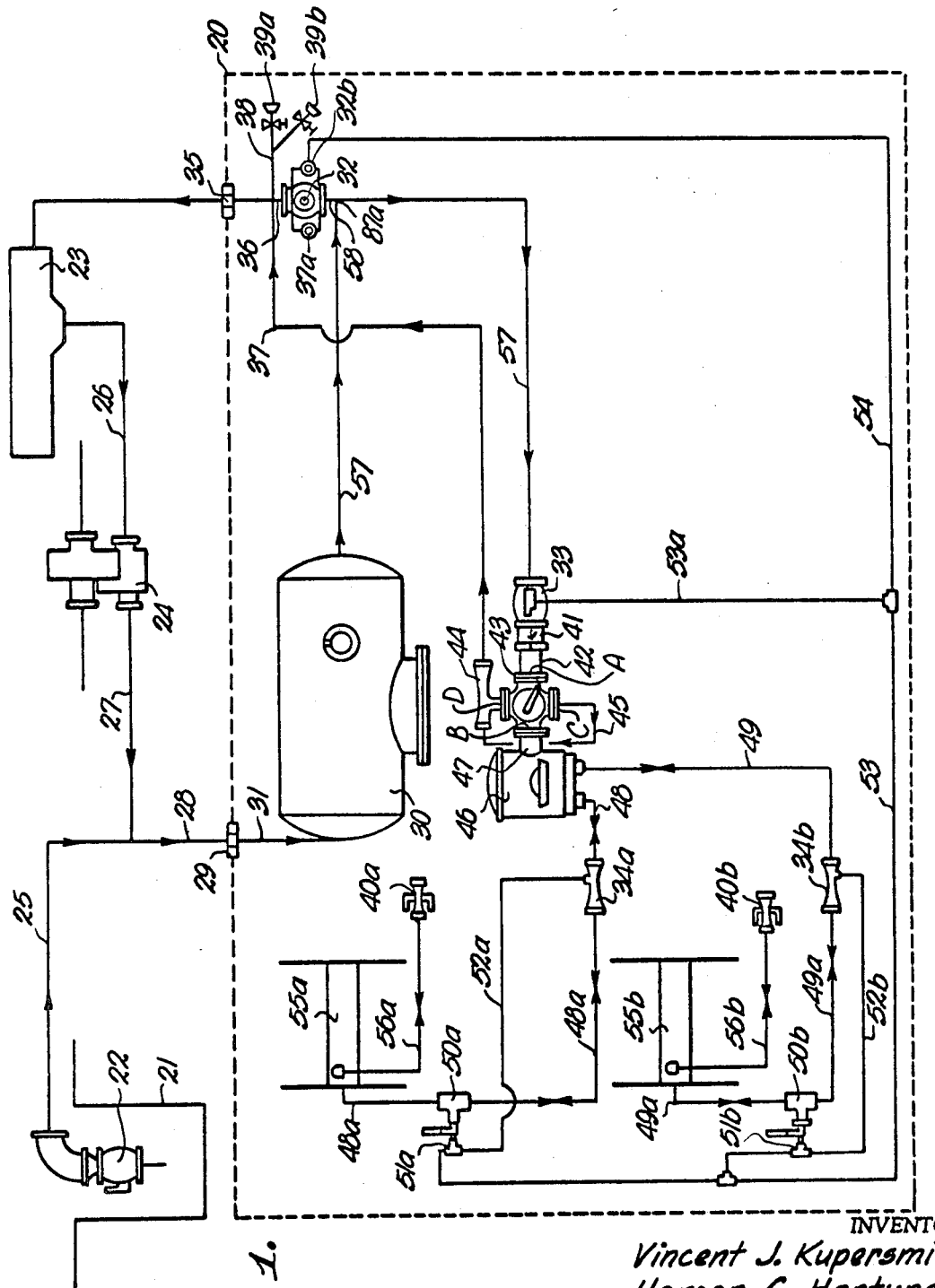

Referring to FIG. 1 the necessary apparatus for use with the aircraft fueling and defueling device of the instant invention in certain of its applications will first be described. In the drawing, these components are shown as located outside of the dotted line 20. Hydrant pit 21, having schematically designated typical hydrant 22 thereat, is the conventional airport-available fuel inlet connection of typical airport fixed fueling facilities. This means that there are provided a fuel tank and a pump located off of a vehicle at some suitable airport location. Alternatively as a source of turbojet fuel, there is shown in this figure, schematically, tank 23 which may be considered as installed on a self contained truck or semitrailer type of transport unit in certain applications to be described. Pump 24 may be also installed on self contained truck or semitrailer type transport units. Thus, alternatively, jet fuel may be input to the subject apparatus assembly either from hydrant pit 21 or the tank and pump system via line 25 from the pit or lines 26 and 27 from the tank through the pump. A common line 28, for illustrative purposes only, is seen leading into the subject system.

Turning to the instant improvement, at 29 is schematically shown the fuel inlet into the filter separator 30 via line 31. In actuality, item 29 is simply a pipe or fuel line. Filter separator 30 is a two stage device which removes dirt first and, secondly, coalesces water. Thus water and contaminants are removed from the fuel on inlet to the instant system.

Bypass pressure control valve 32 is a diaphragm operated pressure control valve. It is controlled by two pilot valves. The first one of these, 32a, is integrally sensed to control maximum pump pressure. The second of these, 32b, is sensed from the venturis 34a and 34b in order to serve as an emergency secondary pressure control in the event the primary valve 33 should fail open.

Primary or main pressure control valve 33 comprises an in-line, piston-actuated pressure reducing valve which provides continually controlled pressure into the hose and the aircraft manifold no matter whether the aircraft tank valves are open or closed. As previously mentioned, valve 33 is sensed into the venturis 34a and 34b.

At 35 is schematically indicated the common return line to the fuel tank (or hydrant system) connection. Return 35 is a common return to tank connection for (1) bypass valve 32 from line 36, (2) aircraft defueling operations from line 37 and (3) line 38 from retesting valves 39a and to 39b.

The retest connections 39a and 39b comprise special valve, gauge and adapter assemblies that receive the aircraft fueling and defueling nozzles 40a and 40b for retesting, adjusting and setting system controls, which are the adjustable pilots for primary and bypass pressure control valves.

At 41 past 33 is a one-way check valve which is installed in the system whereby to prevent reverse flow into the line from bypass pressure control valve 32 is primary pressure control valve 33.

Spool assembly 42 is a filler piece or connector which is installed in the piping to join the one-way check valve 41 to the fuel-defuel valve 43 inlet.

Diverter valve 43 (also known as a fuel-defuel valve) operates to provide three-way directional control. Ports A to B are for the fueling operation. Dual flow ports A to C and from B to D are operated in the defueling operation.

Eductor 44 is mounted in the line 45 leading from port C of diverter valve 43 back through the eductor to line 37 leading to tank return connection 35 whereby high pressure line flow of fuel from port A of valve 43 to port C thereof creates a vacuum in eductor 44, thereby causing defueling fuel flow going from port B of valve 43 to port D thereof, same thence returned to the tank or hydrant system, return line, if any, or to vehicle type defueling tank which does not need a pump for defueling.

Meter 46 is connected by a stub line 47 to port B of valve 43 and operates to measure fuel computed in gallons on a direct reading counter. Meter 46 reverses and subtracts in order to compute the defueling flow.

Lines 48 and 49 from separate outputs from meter 46 lead to venturis 34a and 34b. The latter are designed to provide a compensated pressure signal (equal to loss in system between the venturis and the nozzles 40a and 40b ) due to the pressure drop in the throats of the venturis.

Valves 50a and 50b are wafer type line valves that are operable to provide a manual shutoff control for either operational or emergency control of the hoses, or when one hose only is used.

Sensor valves 51a and 51b are three-way valves which are directly connected to the manual line valves 50a and 50b, respectively. Valves 51a and 51b are arranged so that when a line valve 50a or 50b is opened, the correct sensing signal from venturis 34a and b from sense lines 52a and b is always fed into the primary pressure control valve 33 from lines 53 and 53a and, further, to the secondary pressure control valve 32b from line 54.

Reels 55a and 55b are provided for storage of the fueling hoses and are electrically powered. Hoses 56a and 56b are of conventional aircraft refueling type. Nozzles 40a and 40b are of conventional underwing fueling type.

A typical (2) separator 30 usable in the instant system would be a horizontal separator/filter such as is made by the Fram Corporation, Warner Lewis Industrial Filter Division, Tulsa, Oklahoma, model FCS-1264-29N 11. This device, which will not be illustrated or described in exhaustive detail, typically comprises a horizontal tank having two (2) separate mounting plates vertically mounted within the body and dividing the interior into three (3) compartments. The first compartment is fed by the inlet connection. Feed from the inlet connection into the first compartment then passes through a first dividing plate which carries coalescer cartridges mounted on the side thereof facing into the second central compartment. The fuel which exits from the coalescer cartridges into the center compartment may then pass out of the central second compartment into a third compartment communicating with the outlet connection by passing through separator cartridges which are connected to a separator cartridge mounting plate which divides the second central compartment from the third outlet compartment. A sump and water slug may be mounted on the lower portion of the central compartment.

The hydrant fuel connection 22 in the hydrant pit 21 is typically conventional and not part of the instant invention. It may be a valve such as that supplied by the Parker Aircraft Company of Los Angeles, California, a division of the Parker-Hannifin Corporation, their model F313K 4 inch hydrant fuel pressure regulator. Such is a demand-type regulator, designed especially for installation in a hydrant box. It incorporates an integral adapter with a standard 2½ inch bayonet flange for quick connection to the mobile hydrant vehicle. The adapter may have a product selection feature to prevent inadvertent connection to the wrong fuel. It maintains a constant pressure at the point of connection into the vehicle.

Primary (main) pressure control valve 33 may be a regulator as is produced by the Parker Aircraft Company supra, their model F316A 4 inch fuel pressure regulator. This is a demand-type regulator, designed to be mounted in the main flow line of the fueling system and operating to maintain a constant pressure at a selected down-stream sensing point (such as a venturis). It includes a piston operated main shutoff valve and a pilot valve which controls the main valve operation.

Completing the topographic description of the system, line 57 runs from the outlet of separator 30 to the input to valve 33. Line 58 is taken from line 57 to valve 32, lines 48 and 49 continue as lines 48a and 49a from venturis 34a and 34b to reels 55a and b through valves 50a and 50b.

With respect to power provided to the pump, the tanks and pumps are never in the integral fueling and defueling device, apparatus and system of applicant. In the system of FIG. 9 the pump is fixed to the truck, the engine power passes to a gearbox and then to the pump or back axle, alternatively. In system F10, there is a power take off from which runs a hydraulic drive system or pump. All of the latter is on the prime mover for the semitrailer and hydraulic lines pass from the hydraulic drive system or pump to the hydraulic motor on the semitrailer itself thereby driving the product pump. System F11 is the same as system A-1 but is not powered. System F9 has no tank or pump, save in certain cases where there is an auxiliary pump for defueling.

FIG. 2 FUELING FLOW AND SENSING SIGNAL

Figure 2:
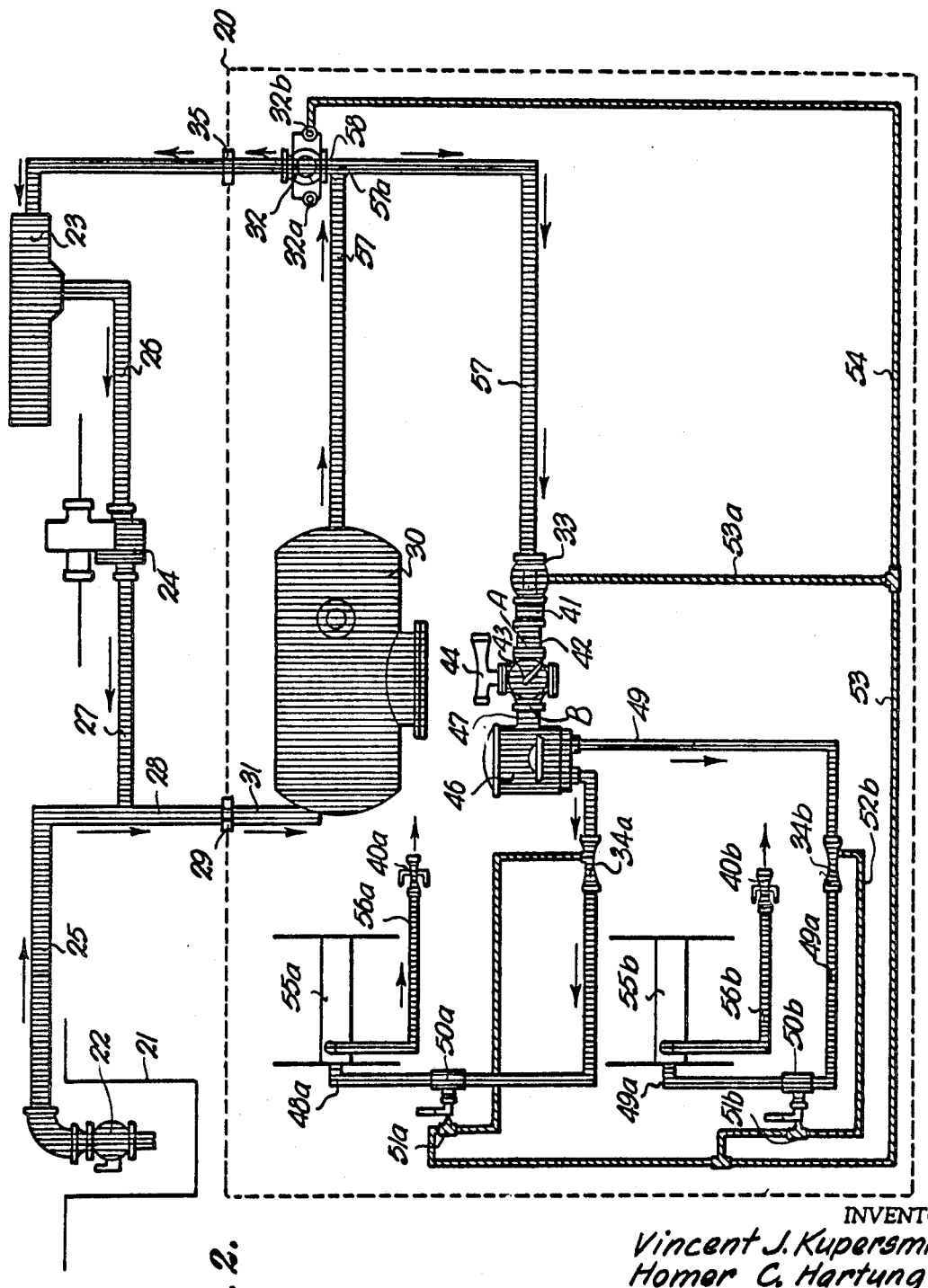
FIG. 2 is a view or schematic flow diagram similar to that of FIG. 1, but with the fueling flow indicated within the system by the vertical shading and the sensing signal for the fueling flow indicated by the diagonal shading.
Figure 3:
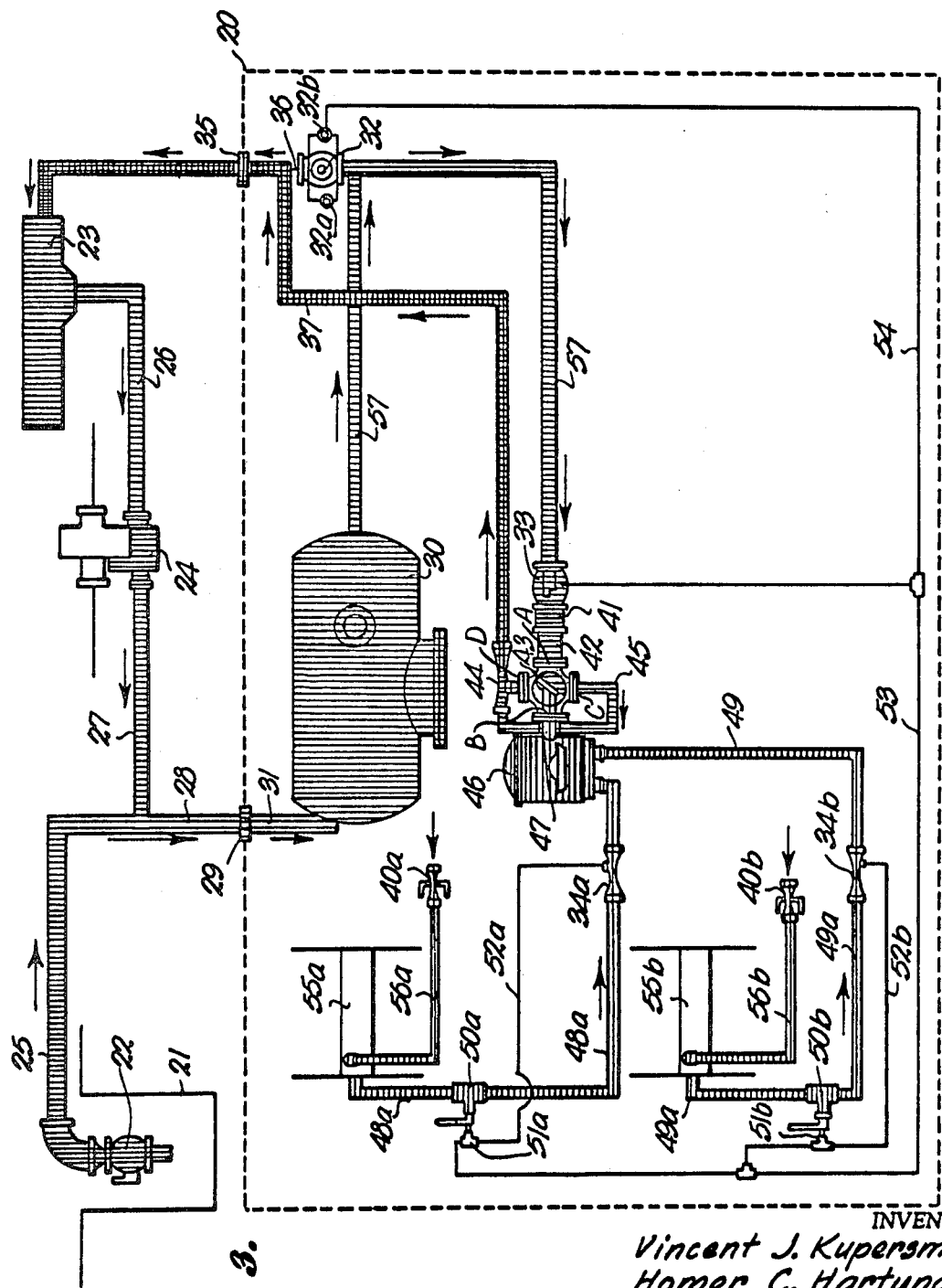
FIG. 3 is a view similar to those of FIGS. 2 and 1, but showing the defueling flow utilizing pressure flow to create a fuel-drawing vacuum in an eductor tube. The pressure flow is indicated by the vertical shading in this view, while the defueling flow is indicated by the horizontal shading.

Referring to FIG. 2, fuel may come from hydrant pit 21 and pass through lines 25 and 28 to filter inlet connection 29 or it may come from tank 23 on a vehicle, pass through line 26 to a truck pump 24 and therefrom through lines 27 and 28 to connection 29. From thence, the fueling flow passes through filter separator 30 and from the outlet therefrom to line 57 connecting to primary pressure control valve 33. Recycle line 58 is taken from this latter line passing to bypass pressure control valve 32 from whence a line 36 passes to return connection 35 to tank 23.

The function of bypass pressure control valve 32 will now be described.

In fueling, once the fuel flow has reached valve 33, it passes through check valve 41 and thence goes into port A of diverter valve 43 and out port B thereof, thereafter through stub connection 47 into meter 46. From thence, out the two outlet connections from the meter the fuel flow passes via lines 48 and 49 through venturis 34a and b, thence via lines 48a and 49a through manual valves 50a and 50b, into hoses 56a and b into nozzles 40a and b, thence into the aircraft.

Pilot valve 32b in bypass pressure control valve 32 is designed to handle failure open of primary pressure control valve 33. Thus, if valve 33 fails open (fails to close) pressure builds up in venturis 34a and b over a set measure or set working pressure due to the constantly increasing flow. A pressure signal is sent, then, from venturis 34a and b to sensor valves 51a and b via lines 52a and b, thence to pilot valve 32b via lines 53 and 54. Valve 32b operates to take pressure off the diaphragm of bypass pressure control valve 32, thereby allowing it to open the line leading into return connection 35. This permits the flow of fuel in diversion back to the tank.

Pilot valve 32a handles the failure of primary pressure control valve 33 to open. Pilot valve 32a is set several pounds over the required pumping pressure at primary pressure control valve 33. If valve 33 fails closed (to open) then the pressure build up through the recycle line to bypass pressure control valve 32 will cause valve 32 to open and permit fuel diversion back through return connection 35 to the tank.

In fueling, there is one engine speed setting for the two hoses. In defueling, there is another engine speed setting for the two hoses.

Assuming fueling, and the fueling engine speed setting for two hoses in effect, if only one hose 56a is in use, its venturis 34a prevents flow therethrough over approximately 300 gallons per minute. (Depending on engine r.p.m.). This causes a pressure buildup at valve 33 (a lesser pressure buildup than if 33 failed closed, that is, to open), partly closing 33. This thus signals at 32 through the flow line from 32 to 33 thereby causing 32 to partly open for partial recycle fuel diversion through return connection 35 to the tank.

Valve 32 should never open in the defueling operation.

With respect to valve 33, any closing (partial or failure closed) or failing to open operates to sense at 32a.

Working with valve 33 in fueling operations, if the pressure at nozzles 40a and/or 40b rises due to the aircraft tank valves closing, then a pressure rise is sensed at one or more of the venturis 34a or 34b which tends to shut down valve 33 proportionately. (Valve 33 tends to maintain 35 plus or minus p.s.i.g. at nozzles 40a and 40b). Further, via sensing at 32 from valve 33 to divert proportionately to the tank through 32. (Typically when topping off the aircraft tanks).

If valve 33 fails open, then the pressure rise at the venturis senses all the way to 32b and diverts the fuel back to the tank.

Valve 32 is so sized (3 inch diameter) so as to maintain proper pump pressure at all times and secondarily for control in event valve 33 fails open. This keeps pressure in the system (open system).

One-way check valve 41 is in the system primarily because specifications for fuelers universally require a separate check valve at this point. Valve 33 actually works as a one-way check valve, but, due to historical circumstances involving the use of two refuelers on one aircraft, present specifications require 41.

For optimum function of valve 33, a bleed connection back to the tank may be taken from filler piece 42.

Referring to the filter separator 30, on top thereof is placed an air-eliminator (not shown) of conventional type which opens and exhausts air and vapor to tank 23 if the latter is employed. There is an air-eliminator in case the hydrant pit connection is used which is the same exhaust vent line connected downstream of meter instead of back to tank.

On the bottom of the filter separator of 30 there is provided a water slug device (water sump control) wherein presence of sufficient water to lift a float inside the separator will cause, by suitable signal connection, valve 33 to close. Fuel diversion via pilot valve 32a to the tank is not initiated, however, because, in such case, a second signal goes to the power source throttle control whereby to lower the power and shut down the pump to idle speed whereby insufficient pressure is generated to open the bypass pressure control valve 32.

Sensor valves 51a and 51b involve a concept which permits the operator to use either one or both hoses at maximum rated performance. The operator must close the manual valve for the hose not being used or a false signal from the static pressure in that venturis system will cause valve 33 to close resulting in low flow. When the operator closes manual valve 50a via its handle, he also closes the sensing line through sensor valve 51a from venturis 34a.

No flow at nozzle 40a backs the same pressure to venturis 34a which will always exceed the flowing pressure measured at venturis 34b. This signal through sensor valve 51a overrides sensor valve 51b and tends to close valve 33.

Many times, the operator only uses one reel. It is desirable for the operators to close manual valves 50a and 50b after the fueling cycle. If the operator does not and then, in the next fueling cycle attempt, the operator uses only one reel, only one-half to one-third of normal flow can be passed through.

To sum up the fueling operations, fuel travels from either hydrant 22 or tank 23 through filter separator 30. Unneeded fuel is bypassed back to the tank through valve 32 by virtue of primary pressure control valve 33. The latter controls in response to a sensing signal received from sensor valves 51a and 51b. In fueling flow, the fuel flows through check valve 41 and diverter valve 43 (ports A to B). The side port C and D of diverter valve 43 are blocked when in fueling position. Thence the fuel flows into meter 46, through venturis 34a and b and hose valves 50a and b. Either or both of hose valves 51a or b may be opened or closed as desired. Thereafter, the fuel flows into the aircraft through the hoses 56a and b and nozzles 40a and b. The fuel pressure sensing signals are routed to primary pressure control valve 33 and secondary bypass pressure control valve 32.

DEFUELING FLOW UTILIZING PRESSURE FLOW
TO CREATE VACUUM IN EDUCTOR TUBE

In this operation, high pressure fuel flow is utilized to create vacuum for reverse flow of fuel from the aircraft. Thus, high pressure fuel flow from hydrant 22 or truck pump 24 travels through the filter separator 30 and thereafter through primary pressure control valve 33. The latter serves as an open or closed valve only, for this operation. Thereafter, this high pressure fuel flow goes through check valve 41 into diverter or fuel-defuel valve 43. The latter has been shifted mechanically from the fueling operation position whereby to divert the high pressure fuel flow coming through spool assembly connection 42 into port A and thence to port C. Thereafter, the fuel flows through the line 45 from port C into the input end of eductor 44. This causes a vacuum to be created at the secondary eductor input port 43 D whereby fuel may be returned to the tank via line 37 from the eductor 44 output to tank return connection 35.

The vacuum pulls fuel in reverse through diverter valve 43 ports B and D from meter 46. The latter reverses and subtracts. Fuel comes into the two lines 48 and 49 of meter 46 from venturis 34a and b and manual hose valves 50a or b. One or both of the latter may be open. The fuel comes from the aircraft wing tanks through the nozzles 40a and b and hoses 56a and b in reverse under this vacuum pull.

Referring to FIGS. 4, 5 and 6, therein is shown the fueling and defueling device condensed structurally, as it were, into an apparatus array which will fit into a frame work, in a typical 600 GPM system of 100 inches wide, 72 inches high and 41 inches deep. This permits the incorporation of the entire fueling and defueling system, less the hydrant connection and piping, into the fueling and defueling device or, described otherwise, same less the tank and truck pump arrangements shown alternatively in FIG. 1. When all of the fueling and defueling elements seen within the dotted line 20 and FIG. 1 have been condensed within this frame, then, the various vehicular and nonvehicular applications seen in FIGS. 9—14, inclusive, are possible.

FIGS. 4, 5 and 6 show a typical and optimal such apparatus condensation into a single frame and unitary construction whereby the fueling and defueling device may be mounted on a truck as in FIG. 9 with or without a booster pump on the said truck bed, but with the general fuel source being a hydrant pit. Likewise, the frame or structural unit may be mounted on the end of a truck frame carrying a tank as in FIG. 10. In FIG. 11, one sees the framed fueling and device of FIGS. 4—6, inclusive, merely mounted on the bed of a cart having four wheels mounted thereon and a drag bar for tractor connection. FIG. 12 shows the frame of FIGS. 4—6 mounted on any suitable sort of fixed bed or base with a pipe connection into the fuel inlet 29, typically from a hydrant pit. FIG. 13 again shows the frame assembly of FIGS. 4—6, inclusive, mounted on the back of a vehicle, in this case, the back of a trailer. This is strictly analogous to FIG. 10 save that the power for the pump on the trailer in FIG. 13 would come from the prime mover, while the truck engine itself would furnish the power for the pump in FIG. 10. FIG. 14 merely shows the framed assembly of FIGS. 4—6, inclusive crated for foreign export.

Referring, then, to FIGS. 4—6, inclusive, and comparing same with FIG. 1, like numerals in FIGS. 4—6, inclusive, refer strictly to the schematically designated parts in the flow diagram of FIG. 1. Not all of the parts seen in FIG. 1 are seen in the three (3) views of FIGS. 4—6, inclusive, but sufficient of the parts can be seen, when additionally compared with the application views of FIGS. 9—14 to see the manner in which the apparatus is scaled into the unit.

At 60 is shown the front angle iron from which rearwardly extend bottom beam members 61 and 62 connecting at the rear thereof with rear angle iron or structural 63. Three front vertical structurals 64, 65 and 66 extend upwardly to join front top horizontal member 67. Front horizontal structural 67 is connected by two rearwardly extending structurals 68 and 69 with rear vertical corner structurals 70 and 71, as well as a rear transverse horizontal upper structural member, not seen, 72. Horizontal structurals both transverse and rearwardly extending as at 73 in FIG. 4 and 74 in FIG. 6 are provided as needed for lateral and depth bracing. The essential desire is to enclose the entire fueling and defueling device array within rectangular structurals, forward and rearward and side, whereby, when it is desired to transport, replace, move, substitute, or otherwise manipulate the unit, same may be simply crated into conventional rectangular panels or siding enclosures as seen in FIG. 14 or crane lifted on or off its support on ground or vehicle. Weather proofing and protective sealing may be employed as desired depending on the distance and conditions of shipping.

FIGS. 5 and 6 show a platform generally designated 75 which is weldably or otherwise fixedly attachable to the working face of the apparatus array, that is, toward the viewer in FIG. 4. Same is not seen in FIG. 4 because it would screen the internal operating components of the device in the view. However, outwardly extending elongate transverse angle iron 76 is connected by suitable horizontal structurals 77 and 78 with frame angle iron 60 from which side vertical structurals 79 and 79a and 80 and 80a extend vertically upwardly. The latter, at their upper ends, are inwardly joined to the vertical front structurals 66 and 64 of the frame by horizontal structurals 81 and 82. A rectangular platform 83 is pivotally mounted on a shaft 84 for hinged movement on member 84 to a vertical position lying against structurals 78a and 80a or a horizontal locked position as seen in FIGS. 5 and 6. Pivotally mounted, yet bracing structurals 85 and 86 extend from engagements with flange mountings 87, 88, 89 and 90.

When the hose reels 55a and 55b are mounted with their rotational axis running parallel to the operating face of the unit (FIG. 4), the operator may pull the hoses toward the viewer in FIG. 6 (to the right in FIG. 4 and left in FIG. 5). In such case, when connections are made as in the manner of FIGS. 9—13, inclusive, the operator may stand viewing the connections with the aircraft wing and, as well, look at the instrumentation, particularly the meter, in the structural frame work. Additionally, with platform 83 present, in underwing fueling and defueling as is seen particularly in FIGS. 10 and 13, with a heavy vehicle mounting, the operator can stand up close under the wing for attachment and detachment.

Referring to FIG. 7, system parts or items which are the same as those in FIG. 1 are numbered the same, but primed. Comparing this system to FIG. 1, all of the functions are present, namely, fueling, defueling and retest. However, there is not provided a vehicle tank and vehicle pump capacity as in FIGS. 10 and 13. Thus, the fuel source is the hydrant 22'. Since there can be no recycle analogous to that which occurs in the system of FIG. 1 when valve 33 fails open (fails to close), as there is no nearby tank or pumping capacity to move fuel from such a tank through the system, valve 32 is omitted. There must then be provided an auxiliary tank, such as tank 90 which may be mounted on any sort of vehicle. Flow line 91 from connection 35' divides into flow lines 92 and 93, controlled by valves 94 and 95. Line 92 is a recycle line to the tanks from which the hydrant system draws. Line 93 is a hose or flow line to tank 90 on vehicle 90a. This could be a subsurface or other fixed tank if such is reachable from the position where the fueling and defueling device is located.

In operation, in fueling, fuel comes from hydrant 22' through line 25', thence through fitting 29' and line 31' to filter separator 30'. From thence the fuel passes via line 57', without option for diversion, directly to main pressure control valve 33'. Thence the fuel passes through check valve 41', spool assembly 42', and through ports A' and B' of diverter valve 43'. Thereafter the flow is through stub line 47' and meter 46' into lines 48' and 49'. The fuel passing through venturis 34a' and 34b' gives signals through lines 52a' and 52b' and sensor valves 51a and 51b back line 53' and 53a' to primary pressure control valve 33'.

When only one hose is in use, its venturis prevents flow therethrough over approximately 300 gallons a minute, depending on hydrant pressure. This causes a pressure buildup at valve 33'. This tends to close valve 33' to one hose flow to protect the aircraft.

Thus it is seen that, in the system of FIG. 7, neither of lines 92 or 93 are employed in the fueling operation.

However, on defueling, the following takes place.

Fuel from hydrant 22' flows through lines 25' and 31' into filter separator 30' and thence into line 57' and valve 33'. Thereafter, the fuel goes into check valve 41', pipe 42' and thence into port A' of valve 43', thence out of port C' of valve 43'. Thereafter, the fuel goes into line 45' and into eductor 44', thereafter passing into line 37'. This causes a vacuum to be created at the secondary eductor input port 43b' whereby fuel may be returned. The vacuum pulls fuel in reverse through diverter valve 43' ports B' to D' from meter 46'. The latter reverses and subtracts. Fuel comes into the two inlet lines 49' and 48' (in the fueling) of meter 46' from venturis 34a' and b' and manual hose valves 50a' or b'. One or both of the latter may be open. The fuel comes from the aircraft wing tank through nozzles 40a' and b' and hoses 56a' and b' in reverse under this vacuum pull. The fuel that is educted from the meter 46' through stub 47' and ports B' and D' of valve 43' passes through the eductor 44', thence to line 37', out fitting 35' and into line 91. From this point, it is diverted, in the case of a recycle to the hydrant tanks, into line 92 through valve 94. If this line is present, then line 93 is only very rarely would be present. Likewise, when line 93 is present, line 92 very rarely would be present. If defueled fuel is passed through line 93 and valve 95 to tank 90 then there is the problem of the volume of tank 90 with respect to the quantity of fuel which is passed in through hydrant line 25' to educt the desired quantity of fuel from the aircraft. A 2:1 ratio would be typical, that is, for every 2 gallons passed into valve 33' from line 57', one gallon would be educted through stub 47'.

Turning to FIG. 8, again, with respect to FIG. 1, numbers on system elements identical to those of FIG. 1 are numbered the same, but double primed. Yet further, the added parts of the system which are the same as those in FIG. 7, namely, the parts used in defueling following fitting 35", are numbered the same as FIG. 7, but primed. (These include numerals 90—95, inclusive). All of the functions in the system of FIG. 8 are the same as described with respect to FIG. 7 save for the fact that there exists a booster pump 24" in the line from the hydrant 22" before filter separator 30". Once past the booster pump 24", all of the functions of the system of FIG. 8 are the same as described in FIG. 7 with the defueling fuel or defueled fuel either going into the hydrant tank recycle through line 92' through valve 94' or to a vehicle tank 90' via line 93' through valve 95'.

Turning to FIG. 9, at 100 is seen a truck having a bed 101 upon which is fixedly mounted a fueling and defueling device 102 of the character described. Hoses 103 and 104 with nozzles 105 and 106 are shown connected to an aircraft wing 107. In the rear view of FIG. 9, there may be seen the operator's platform 108 for under-the-wing defueling. Fuel is input to the system through line 109 from hydrant 110 in pit 111. Generally speaking, there will not be a pump system on a small truck mounted hydrant servicer application of this type, although it is conceivable that a booster pump schematically indicated at 24" in FIG. 8 may be employed.

Referring to FIG. 10, truck 112 has fuel tank 113 mounted on bed 114 thereof and also pump means 115 on the truck frame driven by any suitable power takeoff. A connection from the tank into the subject fueling and defueling device 116 is employed of the type seen at 29 in FIG. 1 and a connection out of the device in recycle to the tank is seen as schematically indicated at 35 in FIG. 1. An extension 117 of the frame carries fueling device 116, fixedly attached thereto. Platform 118 may be supplied as in FIGS. 5 and 6 and hoses 119 and 120 run rearwardly as is seen in the rear view of FIG. 10 the hoses are connected to aircraft wing 121 by conventional nozzles. In the rear view of FIG. 10, a detailed view would show the same structure as FIG. 4.

FIG. 11 shows side and rear views of the subject fueling and defueling device 122 mounted on bed 123 of a cart having wheels 124 and a drag bar 125 to be connected to any suitable tractor. Fuel is input to the subject device through hose 126 connected to hydrant 127 in pit 128. Hoses 129 and 130 are connected to aircraft wing 131 by suitable nozzles. The side view of FIG. 11 is that view seen in FIG. 4. The end views or rear views of the vehicles in FIGS. 9 and 11 are the same view as FIG. 5 of the subject fueling and defueling device. In the rear view of FIG. 11, a platform 132 analogous to the platform seen in FIGS. 5 and 6 may be employed, but the stability of the cart may not permit such use.

Referring to FIG. 12, at 133 is schematically designated one of the subject fueling and defueling devices bolted or otherwise fixedly attached to a fixed raised base or platform 134. Fuel is supplied to the system through a hose or pipe connection 135 controlled by valve 136, although this may be directly to a hydrant pit as in FIGS. 11 or 9. Hoses 137 and 138 are connected to aircraft wing 139 by conventional nozzles. The view of FIG. 12 is the same as FIG. 4, schematic.

The two views of FIG. 13 show a tractor truck unit generally designated 140 coupled via its bed 141 to a trailer generally designated 142 having fuel tank 143 thereon. Trailer 142 has structural extension 144 at the end thereof which carries, fixedly attached thereto, the subject fueling and defueling device 145. The view in the side view of FIG. 13 of device 145 is the view of FIG. 6. Hoses 146 and 147 are connected by standard nozzles to aircraft wing 148. A platform 149 is shown in the side view of FIG. 13, but not in the end view of FIG. 13.

The flow diagram of FIG. 1 is typically seen in the applications of FIG. 10 and 13. The flow diagram of FIG. 8 is typically seen in the modification of FIG. 9 with a booster pump on the truck bed. The flow diagram of FIG. 7 is typically that of FIG. 9 without the booster pump, FIG. 11 and FIG. 12.

In FIG. 14, there is merely shown front and side views of a created unit generally designated 150 knocked-down in package application for export.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. An aircraft fueling and defueling system comprising:
   a fuel input line (F1-31),
   a filter separator (FS-30),
   a main pressure control valve (MPCV-33),
   a fuel flow line (F2-57) from FS to MPCV,
   a fuel-defuel valve (FDF-43) having a fueling flow passage (A-B) therethrough, a bypass fuel flow passage (A-C) therethrough, and a defueling flow passage (B-D) therethrough,
   a fuel line (F3-41) from MPCV to the inlet A to the fueling flow passage (A-B) in FDF,
   a reversing meter (M-46),
   a fuel line (F4-47) from the outlet B of the fueling flow passage FDF to M,
   a venturis (V1-44) with inlet and entrainment D connections,
   a fuel line (F5-45) from the outlet C of the bypass fuel passage to the inlet connection of V1,
   the entrainment connection D of V1 connected to the outlet D of the defueling passage in FDF,
   the outlet B of the fueling flow passage in FDF being the inlet B of the defueling (B-A) passage in FDF,
   a bypass pressure control valve (BPCV-32) having a flow passage therethrough with inlet and outlet openings,
   a flow line (F6-58) from F2 to the BPCV inlet,
   a flow line (F7-36) from the outlet of BPCV to a fuel receptacle,
   a flow line (F8-37) from V1 outlet to F7 and a flow line (F9-49) from the meter passing to a nozzle (N-40b),
   whereby in fueling operation, fuel travels from a source via F1 through FS, then through F2 to MPCV, thereafter through F3 through the fueling flow passage A-B, thence, through fuel line F4 through meter M, thence through flow line F9 to nozzle N, and
   whereby in defueling operation, high pressure fuel flow passes from a source through line F1 and FS through line F2 to MPCV, thereafter passing through the bypass fuel flow passage A-C and through line F5 to the inlet connection of V1, while defueling flow comes from nozzle N through flow line F9 to meter M, thence through the defueling flow passage B-D of FDF to the inlet connection to V1 and thence from the outlet connection of V1 through flow line F8.

2. A device as in claim 1, including a second venturis (V2-34b) on F9 before the nozzle, a manual flow control valve (MFCV-50b) on F9 between V2 and N, and a sensor valve (SV-51b) on V2 communicating with the main pressure control valve and the back pressure control valve.

3. A device as in claim 1, wherein the MFCV and the sensor valve on V2 are coupled whereby, when the MFCV is shut off, the sensing function is also.

4. An aircraft fueling and defueling system comprising:
   a fuel input line (F1-31),
   a filter separator (FS-30),
   a main pressure control valve (MPCV-33),
   a fuel flow line (F2-57) from FS to MPCV,
   a fuel-defuel valve (FDF-43) having a fueling flow passage (A-B) therethrough, a bypass fuel flow passage (A-C) therethrough, and a defueling flow passage (B-D) therethrough,
   a fuel line (F3-41) from MPCV to the inlet to the fueling flow passage (A-B) in FDF,
   a reversing meter (M-46),
   a fuel line (F4-47) from the outlet of the fuel flow passage in FDF to the M,
   a venturis (V1-44) with inlet and entrainment connections and an outlet,
   a fuel line (F5-45) from the outlet C of the bypass fuel passage to the inlet connection of V1,
   the entrainment connection D of V1 connected to the outlet of the defueling passage D in FDF, the outlet B of the fueling flow passage in FDF being the inlet B of the defueling passage in FDF,
   and a flow line (F6-37) from the V1 outlet to a fuel receptacle, and
   a flow line (F7-49) from the meter passing to a nozzle (N-40b),
   whereby, in the fueling operation, fuel from a source passes through F1 to FS and then via F2 to MPCV and thereafter through fueling flow passage A-B in FDF and fuel line F4 through meter M and flow line F7 to nozzle N, and
   whereby in defueling flow, high pressure fuel flow is utilized to create vacuum for reverse flow of fuel from the aircraft with high pressure fuel flow passing from a source through fuel input line F1 to FS through F2 to MPCV and thence through bypass fuel flow passage A-C through FDF and thence to the entrainment connection of V1, and fuel from the aircraft passes from nozzle N to flow line F9 to the meter and thence to FDF and through defueling flow passage B to D to the inlet connection of V1 and thence via line F8 to a fuel receptacle.

5. A device as in claim 4 including a venturis (V2-34b) on F7 before the nozzle, a manual flow control valve (MFCV-50b) on F7 between V2 and N, and a sensor valve (SV-51b on V2 communicating with the main pressure control valve.

6. A device as in claim 4 wherein the MFCV and the sensor valve on V2 are coupled whereby, when the MFCV is shut off, the sensing function is also.